(12) United States Patent
Nastasi et al.

(10) Patent No.: US 11,485,172 B2
(45) Date of Patent: Nov. 1, 2022

(54) SEALING DEVICE FOR A WHEEL HUB UNIT

(71) Applicant: Aktiebolaget SKF, Gothenburg (SE)

(72) Inventors: Antonia Nastasi, Turin (IT); Daniele Duch, San Gillio (IT)

( * ) Notice: Subject to any disclaimer, the term of this patent is extended or adjusted under 35 U.S.C. 154(b) by 530 days.

(21) Appl. No.: 16/558,786

(22) Filed: Sep. 3, 2019

(65) Prior Publication Data

US 2020/0079148 A1     Mar. 12, 2020

(30) Foreign Application Priority Data

Sep. 10, 2018    (IT) ........................ 102018000008436

(51) Int. Cl.
    *B60B 27/00*       (2006.01)
    *F16J 15/08*        (2006.01)
    *F16J 15/10*        (2006.01)

(52) U.S. Cl.
    CPC ..... *B60B 27/0073* (2013.01); *B60B 2900/211* (2013.01); *B60B 2900/5112* (2013.01); *B60B 2900/5114* (2013.01); *F16J 15/102* (2013.01)

(58) Field of Classification Search
    CPC .............. B60B 27/0073; B60B 27/065; B60B 2900/211; B60B 2900/5112; B60B 2900/5114; F16J 15/06; F16J 15/061; F16J 15/064; F16J 15/10; F16J 15/102
See application file for complete search history.

(56) References Cited

U.S. PATENT DOCUMENTS 9,328,770 B2 *   5/2016   Ishida ................... F16C 33/768
10,093,126 B2 * 10/2018   Weigand ............ B60B 27/0073

FOREIGN PATENT DOCUMENTS

CN        102481806        5/2012
DE    102016218145 A1 *   3/2017
JP        S62108002        7/1987

OTHER PUBLICATIONS

Search Report from corresponding Italy Patent Application No. 2018000087436 dated Apr. 3, 2019.

* cited by examiner

*Primary Examiner* — Gilbert Y Lee
(74) *Attorney, Agent, or Firm* — Reed Smith LLP

(57) ABSTRACT

A sealing device for a wheel hub unit configured to form a static seal to protect the wheel hub unit from environmental contaminants. The sealing device including a shield that is coupled to a collar of the wheel hub unit. The sealing device having a cylindrical lateral mounting wall pressed into the collar, an annular seat with a blind end formed in the cylindrical lateral wall, and a sealing gasket positioned, inside the seat and compressed radially between the groove and the collar, and formed by a sealing compound to allow the formation of a bead against the cylindrical lateral wall in a transport and/or assembly configuration of the sealing device. The bead being movable into the seat by a scraping action exerted by the collar during the assembly of the shield.

5 Claims, 1 Drawing Sheet

SEALING DEVICE FOR A WHEEL HUB UNIT

CROSS-REFERENCE TO RELATED APPLICATIONS

This application claims priority to Italian patent application no. 102018000008436 filed on Sep. 10, 2018, the contents of which are fully incorporated herein by reference.

FIELD OF THE INVENTION

The present invention relates to a sealing device for a wheel hub unit.

BACKGROUND OF THE INVENTION

Sealing devices of the known type have an axisymmetric cup shape such that they seal a space lying between an outer ring and an inner ring of the wheel hub unit, and are made so as to be stably connected to the outer ring for protecting the wheel hub unit from any environmental contaminant (water, mud, debris, etc.).

Chinese patent CN 102481806 discloses a sealing device having a virtually cup-shaped shield, and comprising:

a cylindrical lateral mounting wall force-fitted into a collar of the outer ring of the wheel hub unit with radial interference, and a circular end wall extending in a substantially radial direction, integral with the cylindrical lateral mounting wall, and positioned radially inside the cylindrical lateral mounting wall itself.

The sealing device of the type described above further comprises a resilient sealing gasket applied at the position of an annular chamfer of the cylindrical lateral mounting wall to improve the metal-to-metal seal between the cylindrical lateral wall and the collar, thus preventing the infiltration of water and contaminants and consequently reducing the risk of oxidation and rusting on all the inner surfaces of the wheel hub unit.

In the solution according to CN 102481806, the resilient sealing gasket is radially compressed and axially elongated and stretched during the assembly of the shield inside the collar, and consequently the sealing device described therein must have not only a specific profile for the annular chamfer, but also a specific and accurate profile for the resilient sealing gasket, in order to prevent the mechanical stresses to which the latter is subjected during assembly from damaging the final configuration, that is to say the corresponding sealing capacity.

BRIEF SUMMARY OF THE INVENTION

The care and accuracy required for the forming of such profiles make the production of the sealing device rather complicated and expensive, and the object of the present invention is therefore to provide a sealing device for a wheel hub unit which, for the same sealing capacity, can have a structure that is simple and economical to produce.

According to the present invention, a sealing device for a wheel hub unit, having the characteristics stated in the attached claims, is provided.

BRIEF DESCRIPTION OF THE SEVERAL VIEWS OF THE DRAWING

The invention will now be described with reference to the attached drawings, which show two non-limiting examples of its embodiment, in which.

DETAILED DESCRIPTION OF THE INVENTION

Figure 3:
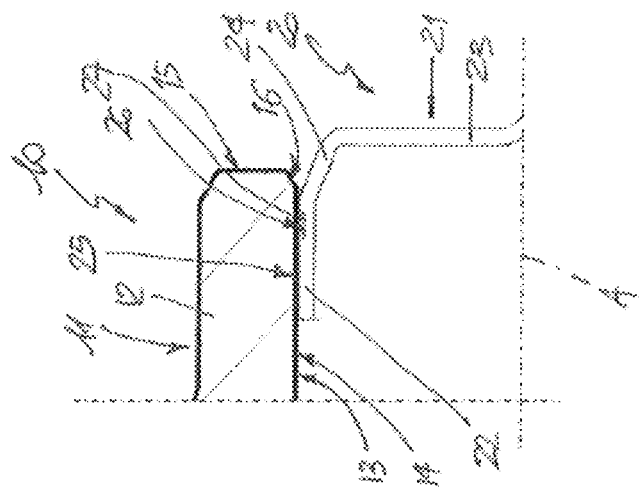
FIG. 3 is an axisymmetric section through the sealing device of the figure in an assembled configuration with a wheel hub unit.

With reference to the attached figures, particularly FIG. 3, the number 10 indicates the whole of a wheel hub unit, which is substantially known and is therefore shown only partially for the sake of simplicity, and which comprises a non-rotating outer ring 11 having an axis of symmetry A.

The outer ring 11 has a cylindrical collar 12, which delimits an inner space 13 of the unit 10, is radially delimited by an inner cylindrical surface 14 coaxial with the axis A, and is axially delimited by an annular surface 15, transverse to the axis A and connected to the surface 14 by an annular front chamfer 16.

In order to seal the space 13, the unit 10 is provided with a sealing device 20 which is stably connected to the outer ring 11 and provides a static seal that protects the unit 10 from any environmental contaminant (water, mud, debris, etc.).

The sealing device 20, according to the present invention, comprises a shield 21, preferably made of sheet metal, which is fitted into the outer ring 11, and which comprises, in turn:

a cylindrical lateral mounting wall 22, force-fitted into the collar 12 with radial interference;

a circular end wall 23 extending in a substantially radial direction, integral with the cylindrical lateral mounting wall 22, and positioned radially inside the cylindrical lateral mounting wall 22; and a conical connecting wall 24 between the lateral wall 22 and the end wall 23, which is inclined towards the end wall 23 and essentially serves to stiffen the structure of the shield 21. This connecting wall 24 is not an essential characteristic of either the present invention or any corresponding product, since the shield 21 may be provided with alternative stiffening elements of a different type from the conical wall 24.

Figure 1:
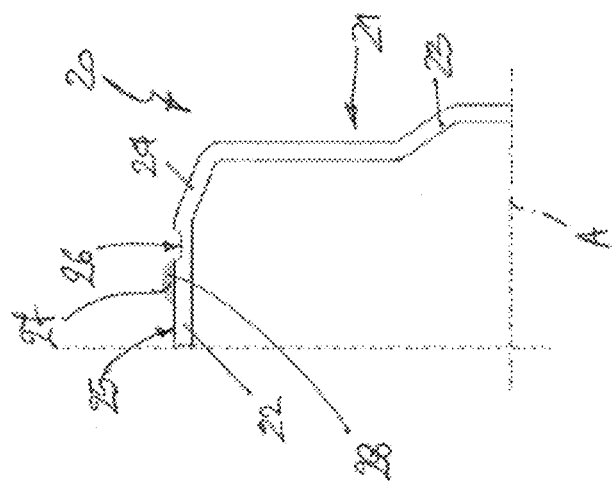
FIG. 1 is an axisymmetric section through a preferred embodiment of a sealing device for a wheel hub unit according to the present invention, the device being shown in a pre-assembly configuration.

In the illustrated example of embodiment, the lateral wall 22 is radially delimited outwardly by a cylindrical fitting surface 25 engaged directly with the surface 14 in the collar 12 of the outer ring 11, and is provided, as shown more clearly in FIG. 1, with a groove or seat 26 having a blind end, which is formed through the surface 25 around the axis A, substantially at the position of the conical wall 24.

The sealing device 20 further comprises a sealing gasket 27, which, in use, with the shield 21 assembled inside the collar 12 as shown in FIG. 3, is substantially housed inside the groove 26, whereas, when the shield 21 has not yet been assembled inside the collar 12 and is thus as shown in FIG. 1, the gasket is placed on the surface 25 in its transport and/or assembly configuration, and is formed by a silicone-based sealing compound spread in a continuous annular bead 28 against the surface 25 at the position of, and outside, the groove 26, on the opposite side of the groove 26 from the wall 24. In order to ensure that the sealing gasket 27 can form a seal between the surfaces 14 and 25, or in other words can form an interference fit with the surface 14 even when housed inside the groove 26, the continuous annular bead 28 of sealing compound has a greater volume than the volume of the groove 26 calculated on the assumption that the groove 26 is radially and externally delimited by the surface 25.

Figure 2:
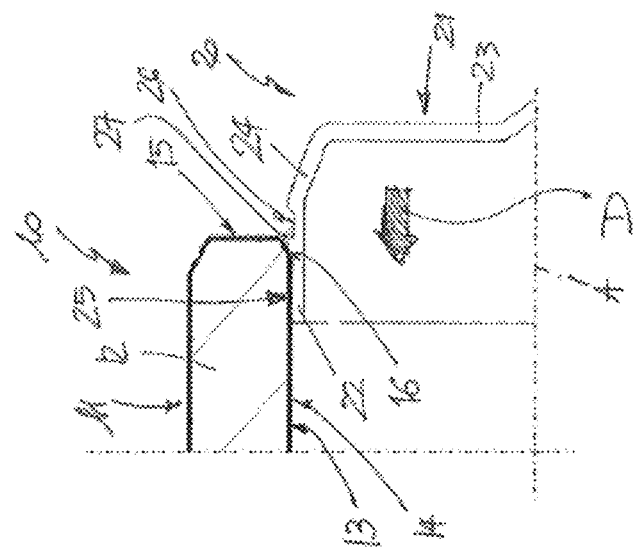
FIG. 2 is an axisymmetric section through the sealing device of the figure in an intermediate configuration of assembly with a wheel hub unit.

The advantage of depositing a bead 28 on the surface 25 with the shield 21 in its transport and/or assembly configuration is evident from what is also shown in FIG. 2, in which it may be seen that, when the shield 21 is moved in a direction parallel to the axis A to insert the shield 21 into the collar 12, the continuous annular bead 28 of sealing compound is intercepted by the chamfer 16, which, since the wall 22 is moved along the axis A and force-fitted into the collar 12, causing the relative sliding of the surface 25 against the surface 14, acts as a scraper on the surface 25 and, by deforming the bead 28, causes it to slide progressively over the surface 25 in the opposite direction to the direction D and to be progressively placed inside the groove 26.

On completion of the mounting of the shield 21 inside the collar 12, that is to say the assembly of the sealing device 20 into the wheel hub unit 10, the bead 28 will be practically entirely transferred into the groove 26, thus forming the sealing gasket 27 in its final configuration. Since, as described above, the continuous annular bead 28 of sealing compound has a greater volume than the volume of the groove 26, the gasket 27 will at least fill the groove 26 completely, and will thus project radially outside the groove 26, coming into contact with the surface 14 and providing the static seal required to protect the wheel hub unit from any environmental contaminant (water, mud, debris, etc.).

It is to be understood that the invention is not limited to the embodiment described and illustrated herein, which is to be considered as an example of embodiment of the sealing device for a wheel hub unit; in fact, the invention can be modified with respect to the form and arrangements of parts and details of construction and operation.

What is claimed is:

1. A sealing device for a wheel hub unit, the sealing device configured to form a static seal to protect the wheel hub unit from environmental contaminants, the sealing device comprising:
    a shield, made of metal that is coupled to a collar of the wheel hub unit, the shield comprising a cylindrical lateral mounting wall, the cylindrical lateral mounting wall comprising a cylindrical fitting surface extending in an axial direction of the collar, wherein the cylindrical fitting surface is configured to be pressed into an inner cylindrical surface of the collar with radial interference,
    an annular seat with a blind end formed in the cylindrical lateral wall and extending radially inwardly from the cylindrical fitting surface, and
    a sealing gasket positioned inside the seat and compressed radially between the groove and the inner cylindrical surface of the collar and formed by a sealing compound to allow the formation of a bead against the cylindrical lateral wall in a transport and/or assembly configuration of the sealing device, the bead being movable into the seat by a scraping action exerted by the collar during the assembly of the shield.

2. The sealing device of claim 1, wherein the bead has a greater volume than the volume of the seat.

3. The sealing device of claim 1, wherein the shield further comprises an end wall extending in a radial direction and integral with the cylindrical lateral mounting wall, wherein the cylindrical fitting surface is on a distal end of the cylindrical lateral mounting wall from the end wall.

4. The sealing device of claim 3, wherein the shield further comprises a conical connecting wall connecting the end wall and the cylindrical lateral mounting wall.

5. A method of forming a static seal between a sealing device and a wheel hub unit, the sealing device configured to form a static seal to protect the wheel hub unit from environmental contaminants, the method comprising:
    providing a shield, made of metal that is coupled to a collar of the wheel hub unit, the shield comprising a cylindrical lateral mounting wall, the cylindrical lateral mounting wall comprising a cylindrical fitting surface extending in an axial direction of the collar, wherein the cylindrical fitting surface is configured to be pressed into an inner cylindrical surface of the collar with radial interference,
    providing an annular seat with a blind end formed in the cylindrical lateral wall and extending radially inwardly from the cylindrical fitting surface, and
    positioning a sealing gasket positioned inside the seat and compressing the sealing gasket radially between the groove and the inner cylindrical surface of the collar;
    wherein positioning the sealing gasket comprises positioning a sealing compound on the cylindrical fitting surface outside the groove, forming a bead of the sealing compound between the cylindrical fitting surface and the inner cylindrical surface in a transport and/or assembly configuration of the sealing device, and moving the bead into the seat by a scraping action exerted by the collar during the assembly of the shield by movement of the shield in the axial direction.

* * * * *